(12) United States Patent
Hance et al.

(10) Patent No.: US 10,261,571 B2
(45) Date of Patent: Apr. 16, 2019

(54) BACKUP POWER SUPPLY SUPPORT

(71) Applicant: HEWLETT PACKARD ENTERPRISE DEVELOPMENT LP, Houston, TX (US)

(72) Inventors: Edgar Hance, Houston, TX (US); David W. Engler, Cypress, TX (US); Han Wang, Sugar Land, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 58 days.

(21) Appl. No.: 15/325,179

(22) PCT Filed: Oct. 31, 2014

(86) PCT No.: PCT/US2014/063548
§ 371 (c)(1),
(2) Date: Jan. 10, 2017

(87) PCT Pub. No.: WO2016/069019
PCT Pub. Date: May 6, 2016

(65) Prior Publication Data
US 2017/0160789 A1 Jun. 8, 2017

(51) Int. Cl.
*G06F 1/32* (2006.01)
*G06F 1/3287* (2019.01)
(Continued)

(52) U.S. Cl.
CPC .............. *G06F 1/3287* (2013.01); *G06F 1/28* (2013.01); *G06F 1/30* (2013.01); *G06F 1/3275* (2013.01); *G06F 1/3296* (2013.01); *G06F 1/26* (2013.01)

(58) Field of Classification Search
CPC .................................... G06F 1/26; G06F 1/32
See application file for complete search history.

(56) References Cited

U.S. PATENT DOCUMENTS

| 5,640,357 A | 6/1997 | Kakimi |
| 7,893,560 B2 | 2/2011 | Carter |

(Continued)

FOREIGN PATENT DOCUMENTS

| CN | 102497004 | 6/2012 |
| JP | 2004048964 | 2/2004 |

OTHER PUBLICATIONS

PCT/ISA/KR, International Search Report dated Jun. 16, 205, PCT/US2014/063548, 12 pps.

(Continued)

*Primary Examiner* — Phil K Nguyen
(74) *Attorney, Agent, or Firm* — Hewlett Packard Enterprise Patent Department (57) ABSTRACT

Example implementations relate to backup power supply support. For example, a backup power supply support system can include a shared backup power supply controlled by a backup power control module and a support switch coupled to the shared backup power supply. The support switch enables a transition from a primary power supply to the shared backup power supply and the support switch includes system firmware. The system firmware detects a primary power supply compromise, isolates a hardware switch from the shared backup power supply, enables the hardware switch, and transitions to the shared backup power supply.

18 Claims, 4 Drawing Sheets

(51) Int. Cl.
    *G06F 1/28*      (2006.01)
    *G06F 1/30*      (2006.01)
    *G06F 1/3234*    (2019.01)
    *G06F 1/3296*    (2019.01)
    *G06F 1/26*      (2006.01)

(56) References Cited

U.S. PATENT DOCUMENTS

| | | |
|---|---|---|
| 7,991,588 B1 | 8/2011 | Krieger |
| 8,819,368 B2 | 8/2014 | Sartore |
| 8,836,167 B2 | 9/2014 | Chen |
| 2004/0103238 A1* | 5/2004 | Avraham ............ G06F 11/1441 711/102 |
| 2004/0133815 A1* | 7/2004 | Cheng ................ G06F 11/1441 713/300 |
| 2004/0246855 A1* | 12/2004 | Kobayashi ............ G11B 19/04 369/53.21 |
| 2005/0229016 A1* | 10/2005 | Addy ........................ G06F 1/30 713/300 |
| 2006/0026297 A1* | 2/2006 | Kung .................... G06F 1/3203 709/239 |
| 2008/0215808 A1 | 9/2008 | Ashmore et al. |
| 2009/0164820 A1* | 6/2009 | Abraham .................. G06F 1/30 713/323 |
| 2010/0164290 A1 | 7/2010 | Chiang |
| 2010/0308876 A1* | 12/2010 | Kawasaki ............. G06F 1/3203 327/143 |
| 2011/0260538 A1 | 10/2011 | Huang |
| 2011/0271143 A1 | 11/2011 | Cho |
| 2012/0221891 A1 | 8/2012 | Shimizu |
| 2012/0300526 A1* | 11/2012 | Chuang .................. H02J 9/005 363/146 |

OTHER PUBLICATIONS

Shuichang Li, "A Three-switch Structure for Pemfc and Ultracapacitor Hybrid in Backup Power," May 17-20, 2009, http://ieeexplore.ieee.org/xpl/login.jsp?tp=&arnumber=5157789&url=http%3A%2F%2Fieeexplore.ieee.org%2Fxpls%2Fabs_all.jsp%3Farnumber%3D5157789.

* cited by examiner

BACKUP POWER SUPPLY SUPPORT

BACKGROUND

As reliance on computing systems continues to grow, so too does the demand for reliable power systems and back-up schemes for these computing systems. Servers, for example, may provide architectures for backing up data to flash or persistent memory as well as back-up power sources for powering this back-up of data after the loss of power. Backup power supplies may sometimes include energy components such as capacitors or batteries.

DETAILED DESCRIPTION

A computing data storage system can include a number of nodes that support a number of loads. The nodes can be a number of servers, for example. A number of loads can include storage controllers or devices associated with the servers. For example, a load can include cache memory, dual inline memory modules (DIMMs), Non-Volatile Dual In-Line Memory Modules (NVDIMMs), and/or smart array control logic, control logic (e.g., Asynchronous DRAM Refresh (ADR) logic), among other storage controllers and/or devices associated with the servers. A computing data storage system can include a backup power system operatively coupled to the number of nodes to support the number of loads in an event of a removal of a primary power supply.

A removal of a primary power supply can be scheduled or un-scheduled. For instance, a scheduled removal of the primary power supply can be the result of scheduled maintenance on the number of nodes and/or the number of loads. A scheduled removal of the primary power supply can be an intentional power down of the number of nodes and/or the number of loads to add and/or remove nodes to a chassis and/or network connected to a primary power supply. In another example, a scheduled removal of the primary power supply can be an intentional power down to add and/or remove one or more loads to or from one or more nodes.

An un-scheduled primary power supply removal can be a failure in the primary power supply. An un-scheduled primary power supply removal can occur when, for example, the primary power supply fails momentarily and/or for an extended period of time. Failure can include an unintentional loss of power to nodes and/or loads from the primary power supply.

It may be desirable to move data from cache memory in the number of nodes to non-volatile memory upon the removal of a primary power supply. However, moving data from cache memory to non-volatile memory can involve a power supply. A backup power supply can be a secondary power supply that is used to provide power for moving data from cache memory to non-volatile memory when the primary power is removed.

In accordance with examples of the present disclosure, a backup power supply support system can enable and/or disable hardware switch circuitry to prevent power surge problems. Enabling and/or disabling the hardware switch circuitry can prevent damage to the motherboard when a design flaw and/or power surge may be present. As used herein, enabling a hardware switch refers to the hardware switch remaining operable and/or functioning as designed. Alternatively, disabling the hardware switch can refer to the hardware switch remaining off, non-enabled, and/or not functioning to transition.

Figure 1:
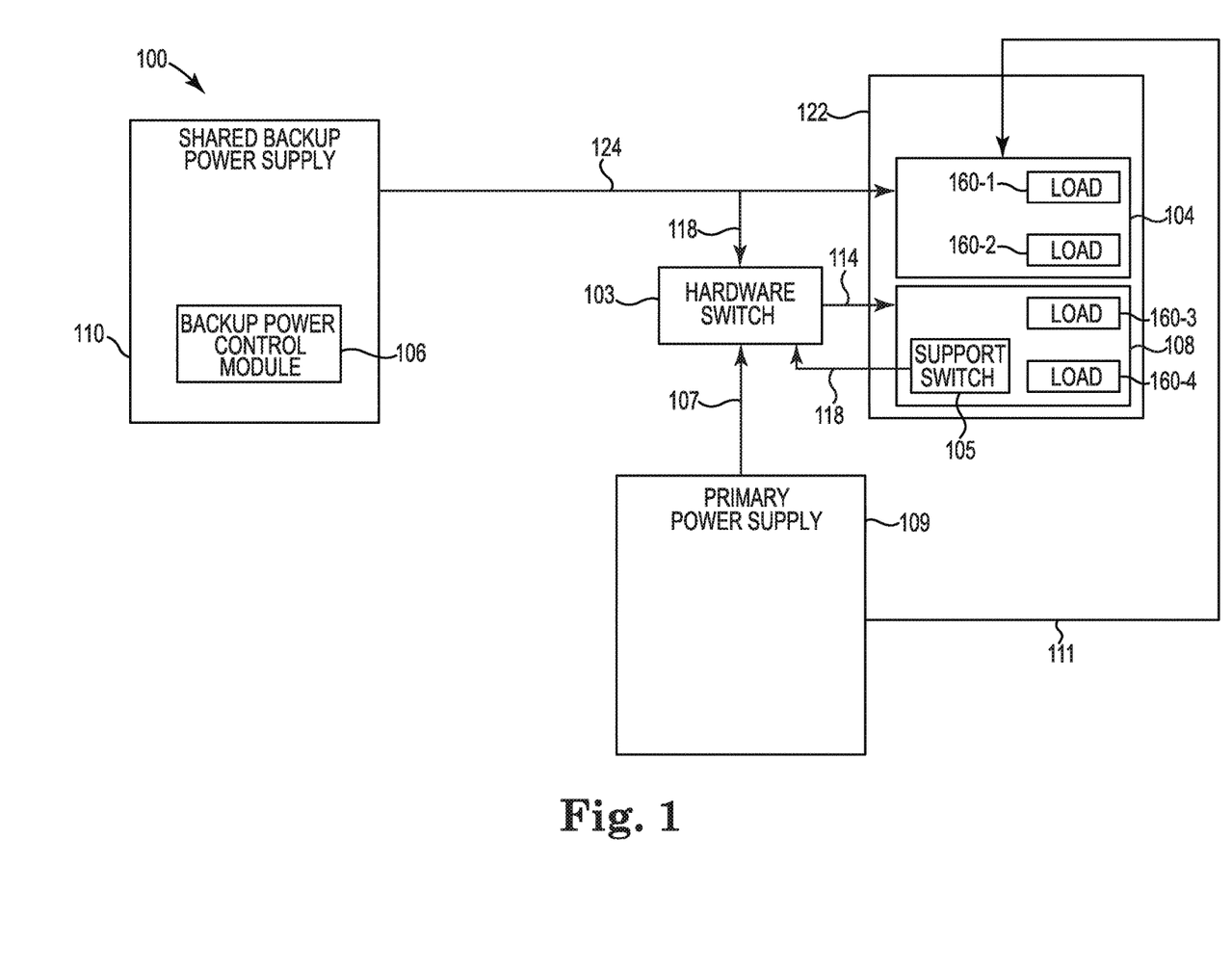
FIG. 1 illustrates a block diagram of an example of a backup power supply support system, according to the present disclosure.

FIG. 1 illustrates a block diagram of an example of a backup power supply support system 100, according to the present disclosure. As illustrated in FIG. 1, the system 100 can include a shared backup power supply 110 controlled by a backup power control module 106, and a support switch 105 coupled via a link 118 to a hardware switch 103. The link 118 can include a physical link.

The support switch 105 can enable a transition from a primary power supply 109 to the shared backup power supply 110. The support switch 105 can include system firmware to detect a primary power supply 109 compromise and to isolate the hardware switch 103. As used herein, the support switch is instructions that can be executed by a processing resource to turn on and/or shut off a device in a particular situation. For example, the instructions can be executed to perform an emergency stop safety mechanism, and/or proceed with a transition as discussed further herein. Further, in some examples, the support switch can be executed to (completely and quickly) abort an operation and/or instruct the execution of operations.

As used herein, the hardware switch 103 is an electrical component that can break an electrical circuit, interrupting the current or diverting it. For example, a hardware switch can be a switch-mode power supply type of transformer. The hardware switch can be connected to the primary power supply 109, the shared backup power supply 110, and sub-module 108 that is associated with the node 122. The hardware switch 103 can be coupled to the sub-module 108 via link 114. The support switch 105 can communicate with the hardware switch 103 via the link 118.

The system firmware of support switch 105 can enable and/or disable the hardware switch 103 and transition power provided to the node 122, from the primary power supply 110 to the shared backup power supply 110. As used herein, transition refers to the change of power supplied to a node 122, transitioning from the primary power supply 109 to power supplied from the shared backup power supply 110 to the node 122.

The shared backup power supply 110 and the backup power control module 106 can be coupled to a sub-module 104 via connection 124. The shared backup power supply 110 can be coupled via link 118 to the hardware switch 103. The hardware switch 103 can be coupled via link 114 to sub-module 108. The shared backup power supply 110 can be controlled by the backup power control module 106, as discussed further in relation to FIGS. 2 and 3.

Similarly, the primary power supply 109 can be controlled by a main power module (not illustrated). The primary power supply 109 and the main power module can be coupled by link 107 to the hardware switch 103. The primary power supply 109 and the main power module can be coupled by link 111 to the sub-module 104 on the node 122.

Also, as illustrated in FIG. 1, the node 122 can include a plurality of sub-modules 104, 108. The node 122 can support a plurality of loads (e.g., load 160-1, load 160-2, load 160-3, and load 160-4, collectively referred to herein as loads 160). For instance, the node 122 can support plurality of sub-modules 104, 108 that can include a number of storage controllers and/or a number of storage devices such as NVDIMMs. In some examples, a hardware switch can be embedded in a load (not illustrated in FIG. 1). For instance, a separate hardware switch can be embedded in each of load among the plurality of loads 160-1 and 160-2.

The node 122 can include a Baseboard Management Controller (BMC) unit that enables communication between the shared backup power supply 110 and the sub-module 104 and the loads 160-1, 160-2. The BMC unit can be a specialized microcontroller embedded on the motherboard of the node 122, and that manages the interface between system management software and platform hardware. The BMC unit can be computer executable instructions stored on the node 122. Examples of the BMC unit can include Basic Input/Output System (BIOS). BIOS provides initialization and testing of the hardware components of the node 122 and loads an operating system for the node when it is powered on. While examples herein use BIOS as examples of a BMC unit, examples of the present disclosure are not so limited.

The system firmware of support switch 105 can enable and/or disable the hardware switch 103 and transition power provided to the sub-modules 104 and 108 on node 122, from the primary power supply 110 to the shared backup power supply 110. The transition to the shared backup power supply 110 can provide power to sub-modules 104, 108. For instance, loads 160-3 and 160-4 may be associated with sub-module 108 on node 122. The node and/or sub-module 108 (and by default, loads 160-3, 160-4) can receive power from primary power supply 109 from the hardware switch 103 via link 114.

The support switch 105 can receive data indicating, for example, additional power requirements for loads 160-1 and 160-2 on sub-module 104. The support switch 105 can communicate with hardware switch 103 to enable a transition to backup power supply 110 to power the sub-modules 104 and 108. The sub-module 104 can be powered by backup power supply 110 via connection 118. The sub-module 108 can be powered by the backup power supply 110 via the hardware switch 103 link 114.

Alternatively, for example, the support switch may receive data that loads 160-1, 160-2 associated with sub-module 104 may not, for example, need additional power from the backup power supply 110. The primary power supply 109 providing power to the sub-module 104 via connection 111 suffices. The support switch 105, in this instance, can disable the hardware switch 103 from transitioning to backup power supply 110. That is, the support switch 105 can enable the hardware switch 103 to transition to backup power supply 110 when additional power supply is desired. Alternatively, the support switch 105 can disable the hardware switch 103 from transitioning to backup power supply when additional power is not desired.

Figure 2:
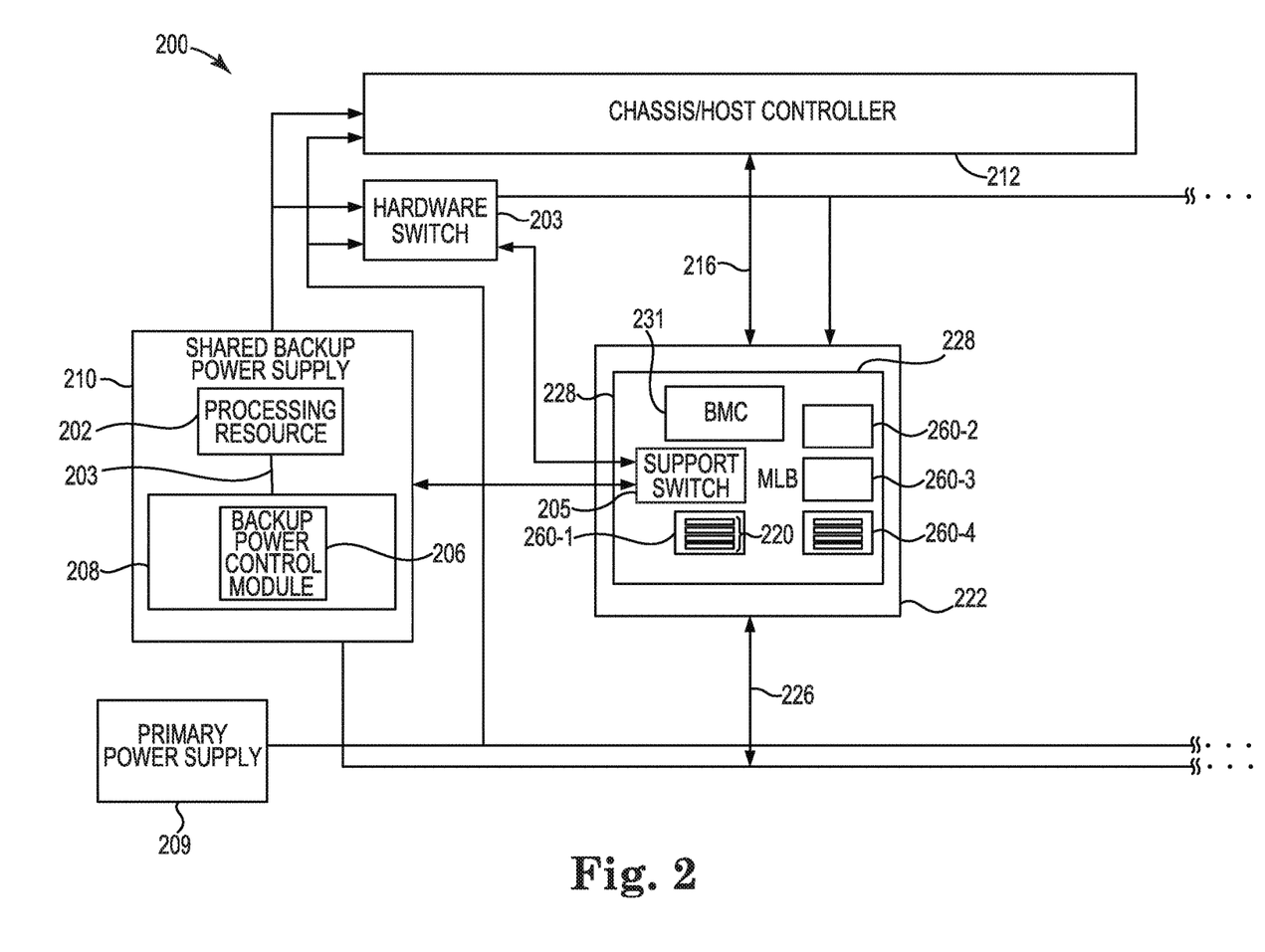
FIG. 2 illustrates an example of a system for backup power supply support, according to the present disclosure.

FIG. 2 illustrates an example of a system 200 for power supply support, according to the present disclosure. As illustrated by FIG. 2, the system 200 includes a shared backup power supply 210, a hardware switch 203, a chassis/host controller 212, and the node 222.

As illustrated in FIG. 2, the node 222 can host a number of loads (e.g., loads 260-1, 260-2, 260-3, 260-4, collectively referred to herein as loads 260). For instance, the node 222 can include a number of devices, such as local memory or data storage (herein referred to generally as memory). The memory may contain volatile and non-volatile memory (e.g., cache and non-volatile memory dual inline memory modules (NVDIMM)). Thus, each memory in the node 222 can contain a number of NVDIMM slots 220. Each NVDIMM slot among the number of NVDIMM slots 220 can provide a load to the system 200. Node 222 can include other devices such as cache memory, DIMMs, array control logic, and storage controllers, among other devices associated with the node 222, and each of the devices associated with the node 222 can provide a load to the system 200. For instance, load 260-2 can be provided by a storage controller, whereas each NVDIMM slot among the number of NVDIMM slots 220 can provide load 260-1. In some examples, the node 222 can also include a control logic unit (not illustrated in FIG. 2).

The shared backup power supply 210 can include a processing resource 202 connected via a connection to a memory resource 208, (e.g., a computer-readable medium (CRM), machine readable medium (MRM), database, etc.). In some examples, a memory resource (e.g., memory resource 208) may be a non-transitory storage medium, medium and/or a non-transitory machine readable medium, where the term "non-transitory" does not encompass transitory propagating signals. The memory resource 208 can include a number of computing modules. Similarly, in some examples, the primary power supply 209 can include a processing resource connected via a connection to a memory resource (e.g., a computer-readable medium (CRM), machine readable medium (MRM), database, etc.).

The example of FIG. 2 illustrates a backup power control module 206. As used herein, a computing module can include program code (e.g., computer executable instructions) hardware, firmware, and/or logic. But a computing module at least includes instructions executable by the processing resource 202 (e.g., in the form of modules) to perform particular actions, tasks, and functions described in more detail herein in reference to FIGS. 3 and 4. Instructions associated with a particular module (e.g., backup power control module 206) when executed by the processing resource 202 can also be referred to and function collectively as a component and/or computing engine. As used herein, an engine can include hardware firmware, logic, and/or executable instructions. But an engine at least includes hardware (e.g., logic in the form of an application specific integrated circuit (ASIC)) to perform particular actions, tasks and functions described in more detail herein in reference to FIGS. 3 and 4.

Engines and/or the number of modules (e.g., backup power control 206) can be sub-engines/modules of other engines/modules and/or combined to perform particular actions, tasks, and functions within a particular system and/or computing device. Engines and/or modules described herein can be located in a single system and/or computing device or reside in separate distinct locations in a distributed computing environment (e.g., cloud computing environment).

Figure 3:
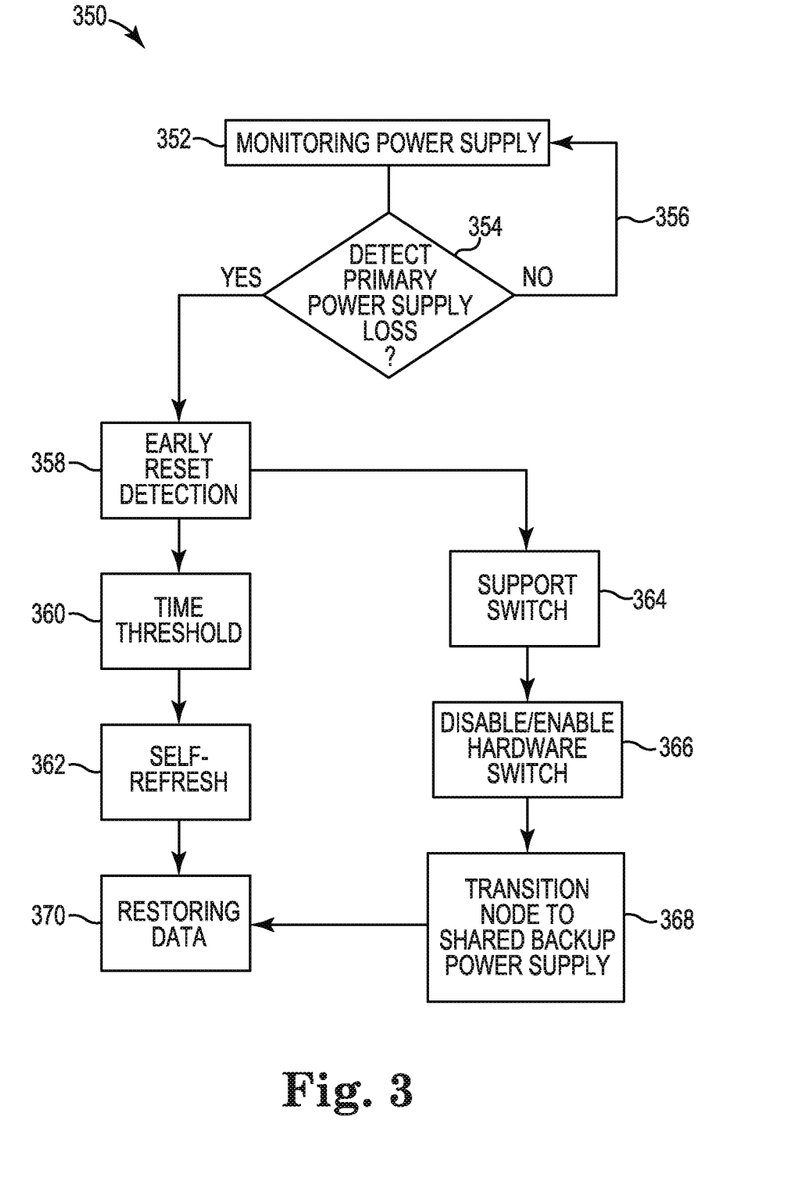
FIG. 3 illustrates a flow diagram of an example of a process of backup power supply support, according to the present disclosure.
Figure 4:
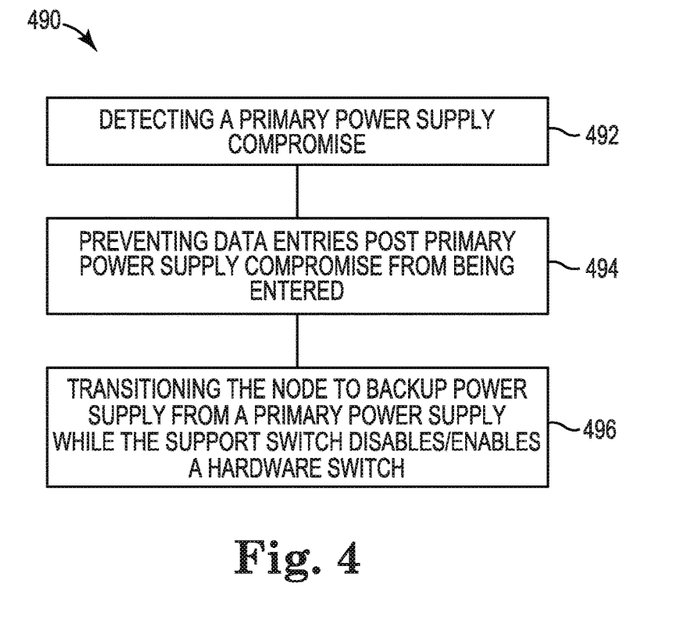
FIG. 4 illustrates a flow diagram of an example of a method of backup power supply support, according to the present disclosure.

The system 200 can perform a number of functions and operations as described in FIGS. 3 and 4, and include the apparatus and methods for power supply support as described herein.

The shared backup power supply 210 can be a battery that is external to the node 222 and external to the chassis/host controller 212 supporting the node 222. The shared backup power supply 210 can provide power to the node 222. The shared backup power supply 210 can support different chassis/host controllers (not illustrated by FIG. 2) to support a plurality of nodes on different chassis.

The node 222 can include a main logic board (MLB) 228, and the MLB 228 can include BMC unit 231. The BMC unit 231 can include a number of components, such as BIOS. The number of components can allow the node 222 to communicate with the shared backup power supply 210 and the chassis/host controller 212. Signal and control lines can connect the shared backup power supply 210 to the chassis/host controller 212 and to the hardware switch 203. The hardware switch can include a multiplexer (MUX). The hardware switch 203 and the chassis/host controller 212 can be coupled to the node 222 via a signal line 216. The signal line 216 can provide for the install, registering, data, and clocking of the node 222 with the chassis/host controller 212.

In some examples, the control logic (not illustrated in FIG. 2) can be coupled to the node via a control signal and power line 226. For example, the node 222 can provide a signal to the control signal and power line 226 and the signal lines 216 when data is to be backed up to non-volatile memory. The control signal and power line 226 and the signal line 216 also couple the chassis/host controller 212 to the node 222 and the control logic.

The backup power control module 206 can have instructions stored in a non-transitory storage medium (e.g., memory resource) to communicate between the BMC unit 231 and the plurality of loads to protect the plurality of loads 260 with backup power, as discussed further in relation to FIGS. 3 and 4. Further, as discussed in relation to FIGS. 3 and 4, the backup power control module 206 can provide instructions to supply backup power to the node 222 from the shared backup power supply 210. A support switch 205 can assist with the transition from the primary power supply 209 to the backup power supply 210. For example, the support switch 205 can protect the node 222 from an over/under current and/or over/under voltage from the shared backup power supply 210. As discussed further below and in relation to FIGS. 3 and 4, the support switch 205 can influence a hardware switch 203, such that the functionality of the hardware switch 203 does not engage with the system 200 after a primary power supply 209 compromise.

The support switch 205 can be connected to the shared backup power supply 210 via connection 220. A hardware switch 203 can be connected to the primary power supply 209. The support switch 205 can enable a hardware switch 203 and/or isolate the hardware switch 203 from the shared backup power supply 210. Isolating the hardware switch 203, as used herein, refers to disabling the switch functionality.

For example, the support switch 205 can enable and/or disable the hardware switch 203 and verify adequate power current to the node 222 from the shared backup power supply 210. Verifying adequate power current can include determining an adequate power voltage and/or current to the node 222 from the shared backup power supply 210. As used herein, an adequate power current refers to a level of power that is within a predetermined voltage and current standard. By determining the power current from the shared backup power supply 210 to the node 222 is adequate, damage to the motherboard may be avoided. For example, a power surge (e.g., voltage and/or current) can be circumvented by disabling the hardware switch 203. The support switch 205 can be used to verify adequate power to the node.

FIG. 3 illustrates a flow diagram of an example of a process 350 of power supply support, according to the present disclosure. Although illustrated in simplified form in FIG. 3, the process 350 can include fewer and/or additional actions.

At 352, the process 350 can include monitoring a primary power supply. Monitoring a primary power supply, as used herein, refers to observing and/or tracking the supply of power from a primary power supply entering the node. The primary power supply (e.g., primary power supply 209 illustrated in FIG. 2) can maintain a power supply to a system (e.g., node 222 as illustrated in FIG. 2, sub-modules 104, 108 as illustrated in FIG. 1) within a particular power range. That is, the primary power supply can provide the system with an amount of power from the primary power supply, which maintains the supply within a predetermined power threshold. The predetermined power threshold can be configured automatically by the system and/or by a user.

At 354, the process 350 can include detecting a primary power supply loss. That is, system firmware of the support switch (e.g., 105, 205 illustrated in FIGS. 1 and 2) can detect whether the primary power supply is compromised. A compromised primary power supply refers to the primary power supply falling outside of a predetermined power threshold. For example, the primary power supply can fall outside of the predetermined power threshold in response a removal of a primary power supply. As previously discussed, a removal of a primary power supply can be a primary power supply disruption, such as a power failure or system reset.

Additionally and/or alternatively, the primary power supply can fall outside of the predetermined threshold when the support switch (e.g., 105, 205 as illustrated in FIGS. 1 and 2) detect an additional power requirement from the node (e.g., 122, 222 as illustrated in FIGS. 1 and 2). For example, the node may have additional loads (e.g., plurality of loads 160, 260 as illustrated in FIGS. 1 and 2) added, which may require additional power. That is, the predetermined power threshold is load dependent. The node power requirement may increase depending upon the plurality of loads connected to the node.

Further, the primary power supply can fall outside of a predetermined power threshold in response to the primary power supply no longer being within the predetermined power threshold. For example, a change in voltage and/or current from the primary power supply can be detected, indicating a primary power supply compromise. In some examples, the change in voltage from the primary power supply can fall outside of the predetermined power threshold.

At 356, the process 350 can include not detecting a primary power supply compromise. A primary power supply compromise is not detected if the loads connected to the node and/or change in voltage, current, etc., changes, but the primary power supply is within the predetermined power threshold. In response to not detecting a primary power supply compromise (e.g., the supply falls within a predetermined threshold power range), the process 350 can include continuing to monitor the primary power supply, at 352.

Additionally and/or alternatively, in response to detecting a primary power supply compromise, at 358, an early reset detection can be triggered. For example, the system firmware of the support switch and/or the node may detect additional loads connected to the node and/or the early reset. A reset can include clearing pending errors or events that bring a system to a normal condition.

Based on the early reset detection and/or additional loads, a particular amount of power for a period of time may be available for the system. That is, the early reset detection can initiate a time threshold, at 360, to prevent power cycling.

The time threshold can be a particular period of time, available to the system, to initiate a self-refresh, as discussed further herein. The particular period of time can be used to preserve data entries, as further discussed herein.

At 362, a self-refresh can be performed. A self-refresh can include preserving data entries prior to the primary power supply compromise. Preserving data entries refers to moving data entries prior to the primary power supply compromise to non-volatile memory for retention. That is, the self-refresh can preserve each data entry among a plurality of data entries, while additionally preventing new entries from being entered and/or accepted by a central processing unit (CPU). That is, entries after the primary power supply compromise (e.g., new entries) may not be accepted by the CPU.

The CPU can be halted, such that only previous entries prior to the primary power supply compromise are preserved. Each data entry can be transferred to the memory and/or preserved while the DIMMs (e.g., DIMM 220 illustrated in FIG. 2) are in self-refresh. In some examples, the data entries prior to the primary power supply compromise can include destination targets which identify a location in system memory for retention. Destination targets, as used herein, are identifiers associated with the data entries that can identify a particular location and/or space within the system memory in which the data entry is associated. For instance, a data entry that includes a destination target may include an identifier associated with a portion of memory.

At 358, the early reset detection can also initiate a support switch, at 364 (e.g., support switch 205 illustrated in FIG. 2). In some instances, the support switch can be initiated by a firmware update. An update can be initiated by an update to the system firmware of the support switch. The support switch can enable and/or disable a hardware switch (e.g., hardware switch 103, 203 illustrated in FIGS. 1 and 2) at 366. The support switch can disable the hardware switch to prevent a circuitry malfunction resulting from an unintended design flaw from sending an overcurrent, undercurrent, overvoltage, or undervoltage through the circuit, which may cause damage to the MLB 228 (e.g., motherboard).

The support switch can disable the hardware switch from functioning and avoiding a power surge. In some examples, the support switch can also isolate the hardware switch from the shared backup power supply to prevent power transition. Isolation of the hardware switch by the support switch is preventing the hardware switch from accessing the shared backup power supply to power the node. Disabling the hardware switch can maintain the primary power supply to the node, but does not use power from the backup power supply.

Further, in some examples, the support switch can enable the hardware switch to prepare for power transition. That is, the primary power supply can be removed and/or severed, such that power from the primary power supply ceases. The support switch can receive information regarding load power requirements connected to the node. If the load power requirements exceed a predetermined power threshold, the support switch can enable the hardware switch to transition to the shared backup power supply to provide additional power to the node. The support switch can communicate with the hardware switch to prepare for power transition.

At 368, the process 350 can include the support switch transitioning the node via the hardware switch, to the shared backup power supply. That is, the hardware switch can receive communications from the support switch to transition the node from the primary power supply to the shared backup power supply. In some instances, the support switch can regulate the transition from the primary power supply to the shared backup power supply. The support switch can regulate the transition by converting power so that a stable voltage/current and/or a predetermined power threshold (e.g., sufficient power level) can be provided to the node. The regulated transition can prevent an unintended power surge from the shared backup power supply. In other words, the support switch can regulate the power (e.g., voltage, current, etc.) supplied by the shared backup power supply.

At 370, the process 350 can include restoring saved data to system memory once the transition to the shared backup power supply is complete. For example, the data entries preserved from the self-refresh as previously discussed in relation to 362, can be restored and implemented within the system. In some instances, upon the transition from the primary power supply to the shared backup power supply, the data can be implemented. For example, the shared backup power supply can power the node and components such that the preserved data can be executed.

FIG. 4 illustrates a flow diagram of an example of a method 490 of power supply support, according to the present disclosure. At 492, the method 490 can include detecting a primary power supply compromise using a support switch of a node, wherein the support switch includes system firmware. The system firmware of the support switch can receive information related to the load power requirement connected to a node, and/or voltage/current of the primary power supply. Power changes (e.g., loads, voltage/current changes) can indicate a primary power supply compromise. Detection the primary power supply compromise can include recognition of planned and/or unplanned primary power supply failures. In some instances, detection can be based on a predetermined power threshold. The predetermined power threshold can be selected by a user and/or automatically designated by the system.

At 494, the method 490 can include preventing data entries prior to the primary power supply compromise from being entered into memory in response to detection of the primary power supply compromise. Data entries received after the detection of a primary power supply compromise may not be saved and/or preserved within non-volatile memory. Data entries converted prior to the primary power supply compromise can be saved into memory, and data entries received after the primary power supply compromise can be prevented from being entered while the node transitions to the shared backup power supply. Additionally, and/or alternatively, the data entries received prior to the detection of the primary power supply compromise can be retained and/or preserved and saved to non-volatile memory. Upon receipt of the shared backup power, the loads can implement the saved data entries within the node.

At 496, the method 490 can include transitioning the node to a shared backup power supply from the primary power supply, using the support switch, while the support switch enables a hardware switch. The support switch can enable and/or disable the hardware switch. Disabling the hardware switch is when transition to a shared backup power supply is not instructed by the support switch and/or not functioning to transition. The hardware switch can maintain power to the node from the primary power supply.

Enabling the hardware switch is the support switch communicating with the hardware switch and instructing the hardware switch to transition to a shared backup power supply. The support switch can notify the hardware switch of a change in power requirements, such as a predetermined power threshold. For example, the loads connected to a node may change and additional power may be needed to power the loads. The support switch can communicate with the hardware switch to enable power transition from the primary power supply to the shared backup power supply. Enabling the hardware switch can include isolating the primary power supply from the node to prepare for the transition. Isolating the primary power supply is when power from the primary power supply ceased.

In some examples, the support switch can remain in an active mode until the transition from the primary power supply to shared backup power supply is complete. As used herein, an active mode refers to the support switch enabling the hardware switch and transitioning the node to the shared backup power supply. That is, the active mode can include the support switch communicating with the hardware switch and/or regulating the shared backup power supply. Upon transitioning back to the primary power supply from the shared backup power supply, the hardware switch can be disabled and maintain power (e.g., voltage, current) from the primary power supply to the node.

In the present disclosure, reference is made to the accompanying drawings that form a part hereof, and in which is shown by way of illustration how a number of examples of the disclosure may be capable of being practiced. These examples are described in sufficient detail to enable those of ordinary skill in the art to practice the examples of this disclosure, and it is to be understood that other examples may be capable of being used and that process, electrical, and/or structural changes may be capable of being made without departing from the scope of the present disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, "logic" is an alternative or additional processing resource to perform a particular action and/or function, etc., described herein, which includes hardware (e.g., various forms of transistor logic, application specific integrated circuits (ASICs), etc.) as opposed to computer executable instructions (e.g., firmware, etc.) stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples may be capable of being made without departing from the spirit and scope of the system and method of the present disclosure, this specification merely sets forth some of the many possible example configurations and implementations.

What is claimed is:

1. A backup power supply support system, comprising:
a shared backup power supply controlled by a backup power control module; and
a support switch coupled to the shared backup power supply, wherein the support switch enables a transition from a primary power supply to the shared backup power supply;
a central processing unit (CPU) that is halted during the transition from the primary power supply to the shared backup power supply; and
wherein the support switch includes system firmware to:
detect a primary power supply compromise;
isolate a dedicated hardware switch for each of a plurality of loads from the shared backup power supply
disable each dedicated hardware switch:
maintain the primary power supply;
enable each dedicated hardware switch;
disable the primary power supply;
transition to the shared backup power supply; and
disengage the primary power supply.

2. The system of claim 1, the support switch further comprising an early reset detection module, wherein the early reset detection module includes a time threshold from which power from the primary power supply is available.

3. The system of claim 2, wherein the early reset detection module initiates a self-refresh period.

4. The system of claim 1, further comprising a self-refresh period prior to the transition to the shared backup power supply, wherein the self-refresh period retains data entries prior to the primary power supply compromise.

5. The system of claim 1, wherein the support switch detects an unplanned primary power supply compromise and initiates a power transition to the shared backup power supply.

6. The system of claim 1, further comprising the system firmware of a support switch to determine adequate power current to a node from the shared backup power supply.

7. A non-transitory machine readable medium storing instructions executable by a processing resource to cause a computer to:
detect a primary power supply compromise associated with a node using a support switch, wherein the support switch includes system firmware;
convert data entries received prior to the primary power supply compromise into memory; and
prevent data entries received after the primary power supply compromise from being entered;
transition the node from the primary power supply to a shared backup power supply using the support switch, wherein the support switch:
isolates a dedicated hardware switch for each of a plurality of loads from the shared backup power supply;
disables each dedicated hardware switch;
maintains the primary power supply; enables each dedicated hardware switch;
disables the primary power supply: and
verifies adequate power current to the node from the shared backup power supply.

8. The medium of claim 7, including instructions executable by the processing resource to initiate a self-refresh period to retain data entries received prior to the primary power supply compromise by moving the data entries to non-volatile memory.

9. The medium of claim 7, including instructions to isolate the primary power supply from the node to prepare for the transition.

10. A method of backup power supply support, comprising:
detecting a primary power supply compromise using a support switch of a node, wherein the support switch includes system firmware to isolate a dedicated hardware switch for each of a plurality of loads from a shared backup power supply by disabling each dedicated hardware switch to maintain the primary power supply and to enable each dedicated hardware switch to disable the primary power supply;

converting data entries received prior to the primary power supply compromise into memory; and preventing data entries prior to the primary power supply compromise from being entered into memory in response to detection of the primary power supply compromise; and transitioning the node to the shared backup power supply from the primary power supply, using the support switch, while the support switch enables each dedicated hardware switch.

11. The method of claim 10, comprising activating a self-refresh period prior to the transition to the shared backup power supply, wherein the self-refresh period moves data entries prior to the primary power supply compromise to non-volatile memory for retention.

12. The method of claim 10, comprising retaining the support switch in an active mode until the transition from the primary power supply to the shared backup power supply is complete.

13. The method of claim 10, comprising restoring saved data to system memory after the transition to the shared backup power supply is complete.

14. The method of claim 10, wherein the data entries prior to the primary power supply compromise include destination targets which identify a location in system memory for retention.

15. The backup power supply support system of claim 1, wherein each of the dedicated hardware switches is embedded in the plurality of loads.

16. The backup power supply support system of claim 1, further comprising a Baseboard Management Controller (BMC) unit that enables communication between the shared backup power supply and the plurality of loads.

17. The backup power supply support system of claim 1, wherein the support switch can regulate the transition from the primary power supply to the shared backup power supply.

18. The backup power supply support system of claim 1, wherein at least one of the dedicated hardware switches is a transformer.

* * * * *